US009831670B2

(12) United States Patent
Humphrey et al.

(10) Patent No.: US 9,831,670 B2
(45) Date of Patent: Nov. 28, 2017

(54) POWER SUPPLY SYSTEM HAVING A REDUNDANT SUPPLY THAT REMAINS ONLINE WHILE SOURCING NO POWER

(75) Inventors: Daniel Humphrey, Houston, TX (US); Mohamed Amin Bemat, Cypress, TX (US); Reynaldo P. Domingo, Spring, TX (US); David P. Mohr, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2202 days.

(21) Appl. No.: 12/433,421

(22) Filed: Apr. 30, 2009

(65) Prior Publication Data

US 2010/0277000 A1 Nov. 4, 2010

(51) Int. Cl.
*H02J 1/10* (2006.01)
*H02J 9/06* (2006.01)

(52) U.S. Cl.
CPC .............. *H02J 1/102* (2013.01); *H02J 9/06* (2013.01); *Y10T 307/696* (2015.04)

(58) Field of Classification Search
USPC ........................................................ 307/64–66
See application file for complete search history.

(56) References Cited

U.S. PATENT DOCUMENTS

| | | | | |
|---|---|---|---|---|
| 4,709,318 A * | 11/1987 | Gephart et al. | ................. | 363/37 |
| 4,788,450 A * | 11/1988 | Wagner | .......................... | 307/64 |
| 4,860,188 A * | 8/1989 | Bailey et al. | ................... | 363/65 |
| 5,982,645 A * | 11/1999 | Levran et al. | ................... | 363/37 |
| 5,994,793 A * | 11/1999 | Bobry | ............................. | 307/64 |
| 6,122,181 A * | 9/2000 | Oughton, Jr. | .................. | 363/37 |
| 6,370,048 B1 * | 4/2002 | Canter | ............................ | 363/65 |
| 6,420,906 B1 * | 7/2002 | Kohda | .......................... | 326/114 |
| 6,987,333 B2 * | 1/2006 | Winick et al. | .................. | 307/85 |
| 7,053,502 B2 * | 5/2006 | Aihara et al. | ................... | 307/46 |
| 7,301,248 B2 * | 11/2007 | Tsai et al. | ....................... | 307/66 |
| 7,355,829 B2 * | 4/2008 | Yamamura et al. | ......... | 361/91.1 |
| 7,379,282 B1 * | 5/2008 | Zansky | .......................... | 361/82 |
| 7,432,617 B2 * | 10/2008 | Kanouda et al. | .............. | 307/66 |
| 7,456,518 B2 * | 11/2008 | Hjort et al. | ..................... | 307/64 |
| 7,466,573 B2 * | 12/2008 | Kojori et al. | ................... | 363/65 |
| 7,616,464 B2 * | 11/2009 | Phadke et al. | ................. | 363/79 |
| 7,705,488 B2 * | 4/2010 | Clemo et al. | ................... | 307/64 |
| 8,546,977 B2 * | 10/2013 | Togare | ............................ | 307/43 |
| 2005/0220021 A1 * | 10/2005 | Sosnowski et al. | .......... | 370/235 |
| 2008/0164759 A1 * | 7/2008 | Sharma et al. | ................. | 307/52 |
| 2008/0169705 A1 * | 7/2008 | Tan et al. | ........................ | 307/66 |
| 2008/0179956 A1 * | 7/2008 | Jiang et al. | ..................... | 307/66 |

(Continued)

FOREIGN PATENT DOCUMENTS

JP          09093833 A  *  4/1997  ............... H02J 9/06

*Primary Examiner* — Adi Amrany

(74) *Attorney, Agent, or Firm* — Trop, Pruner & Hu, P.C.

(57) ABSTRACT

Plural electric power supplies are connected in parallel to an output bus. The plural supplies include a primary power supply and a redundant switching power supply. The primary power supply is configured to provide output current to a load when the primary power supply is operating normally. The redundant supply is configured to remain online while not providing output current to the load when the primary power supply is operating normally, but to begin providing output current to the load when the primary power supply is not operating normally.

20 Claims, 2 Drawing Sheets

(56) References Cited

U.S. PATENT DOCUMENTS

2008/0185914 A1* 8/2008 Randall ............................ 307/64
2008/0197706 A1* 8/2008 Nielsen ........................... 307/66
2008/0266740 A1* 10/2008 Smith .......................... 361/91.5
2009/0243390 A1* 10/2009 Oto ................................. 307/43

* cited by examiner

POWER SUPPLY SYSTEM HAVING A REDUNDANT SUPPLY THAT REMAINS ONLINE WHILE SOURCING NO POWER

FIELD OF THE INVENTION

This invention relates generally to redundant electric power supply systems.

BACKGROUND

An electric power supply is a device or system that is capable of providing electrical energy to a load-typically by converting electrical energy from one form to another to make the energy compatible with the load's requirements. For example, an electric power supply might convert 120 or 240 volt alternating current ("AC") energy to lower-voltage, regulated direct current ("DC") energy appropriate for use by an electronic device such as a computer system. Sometimes power supplies are integrated with the devices for which they supply energy. In other applications, power supplies are discrete components and can be internal or external to the load.

For loads that require a high degree of fault tolerance, it is common to employ redundant power supplies. In prior art redundant power supply systems, plural power supplies drive the load simultaneously. Two general categories of redundant power supply systems exist: power-supply redundant systems and AC-redundant systems. In power-supply redundant systems, the plural power supplies in combination have more than enough capacity to drive the load such that, in the event one of the power supplies fails, the remaining power supplies can continue to drive the load adequately. Thus failure of one power supply in a power-supply redundant system does not interrupt service to the load. A variety of prior art techniques exist for causing the redundant supplies in such a system to share the load's current burden relatively equally. In AC-redundant systems, more than one group of power supplies are employed, wherein each group takes its input from a different source. In an AC-redundant system that employs two such groups of power supplies, twice as many power supplies than needed are present. Use of the term "redundant power supply systems" herein is meant to include both power-supply redundant systems as well as AC-redundant systems.

Switching electric power supplies (also known variously as switch-mode power supplies, switched-mode power supplies and other similar terms) are those that make use of active switching circuitry along with inductive elements to accomplish the energy conversion task with a minimum of energy loss. A common configuration in switching power supplies is to create an internal DC voltage supply that is provided to one or more switching DC-DC output converters for generating desired DC output levels. The DC output levels generated by the output converters are used for driving one or more loads external to the supply. In power supplies that employ this configuration, the internal DC voltage supply that feeds the output converters can be generated from external AC mains or from an external DC supply. For power supplies that take their input from AC mains, rectification circuitry (and in some cases a switching DC-DC power factor correcting converter) is used to create the internal DC supply from the available AC input. For power supplies that take their input from an external DC source, an input DC-DC converter may be used to create the internal DC supply. Whatever circuitry is used to create the internal DC supply for feeding the output converters will hereinafter be referred to as the "input converter."

Start-up is a stressful time for prior art switching power supplies. The bus that connects the power supply to its load (and sometimes the load itself) typically represents a large capacitance that must initially be charged before the bus reaches the nominal output voltage of the power supply. During the time that this capacitance is being charged, power conversion circuits within the power supply may be operating at their maximum outputs, and current transients out of the power supply can be so large as to trigger short circuit protection mechanisms. To address these problems, prior art power supplies have been equipped with soft start circuitry. Soft start circuitry is intended to bring the output voltage of the power supply up to its nominal output level gradually, so as to avoid the harmful current transients that would result if the output voltage were brought up to the nominal level immediately. Soft start is generally accomplished by gradually increasing an internal reference voltage against which an output voltage (or a scaled version thereof) is compared. The interval of time during which the internal reference voltage is raised from its initial value to its nominal value will be referred to herein as the "soft start time interval."

Prior art switching power supplies also include the ability to enable or disable an output converter while the other components of the power supply are operating. In prior art power supplies that possess this capability, however, the soft start circuitry is always reset when the output converter is disabled. Thus, when the output converter is later re-enabled, the soft start circuitry will be activated so that the internal reference voltage against which the output converter's output is compared rises slowly over the soft start time interval.

DETAILED DESCRIPTION OF THE PREFERRED EMBODIMENTS

The inventors hereof have observed that prior art redundant power supply systems sometimes operate inefficiently. This is so because a power supply normally reaches its maximum operating efficiency toward the middle or upper portion of its available load range. But prior art redundant power supply systems are designed to divide the load burden relatively evenly among all of the power supplies in the system, so that each power supply normally operates at a lower portion of its rated capacity. At these lower operating points, the power conversion efficiency of each supply can be less than optimal.

A solution is provided herein in which at least one redundant supply in a system of electric power supplies is online but provides no output current during normal operation. Because the redundant supply is online, it can begin providing output current very quickly should a primary power supply in the system fail. In this manner, redundancy is achieved for high availability, but efficiency is also improved because during normal operation the primary power supply does not share any of the load burden with the redundant supply. Thus the primary supply may operate at a higher portion of its available load range, where its power conversion efficiency is better.

The term "online" as used herein with reference to a power supply shall mean that the input converter of the power supply is on and is acting to keep the internal DC supply within the power supply at its nominal level. Thus, when the power supply is in an online state, its internal DC supply is available to feed an output converter within the power supply regardless of whether the output converter is enabled or switching.

Figures 1, 2:
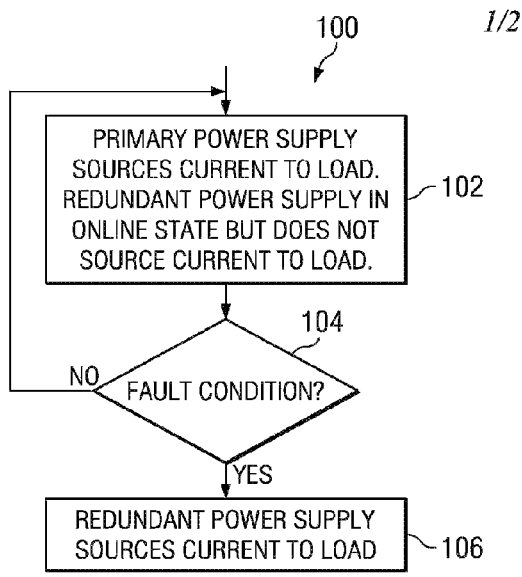
FIG. 1 is a flow diagram illustrating a method of controlling a plurality of electric power supplies according to preferred embodiments of the invention.
FIG. 2 is a schematic diagram illustrating a system of electric power supplies including a redundant switching power supply according to a preferred embodiment of the invention.

FIG. 1 illustrates a method 100 for controlling a plurality of electric power supplies according to an embodiment of the invention. In state 102, at least one primary power supply is on and is providing output current to a load. Simultaneously, a redundant power supply is in an online state but is not providing output current to the load. As step 104 indicates, the system remains in state 102 as long as a fault condition does not occur. But if a fault condition should occur such that the primary power supply ceases operating normally, then the system moves to state 106. In state 106, the redundant supply begins to supply current to the load. The phrase "operating normally" as used herein with reference to a power supply shall mean that the power supply is providing current that is within a range of desired input currents for a load, and is doing so at a voltage level that is within a range of desired input voltages for the load. The range of desired input voltages and currents may be smaller than a range of input voltages and currents that can be tolerated by the load.

Solutions in accordance with FIG. 1 may be achieved using a variety of techniques. FIG. 2 illustrates a system 200 that employs a first such technique. System 200 includes at least two electric power supplies 202, 204. The system may include more than two power supplies depending on the application. Power supplies 202, 204 are connected in parallel to an output bus 206. Output bus 206 may be connected to a load 208. In system 200, power supply 202 is a primary power supply, and switching power supply 204 is a redundant power supply. The primary power supply in varying embodiments of the invention may be a switching or a non-switching power supply. In the embodiment shown in FIG. 2, power supply 202 is a switching power supply.

Power supply 202 is configured to provide current to load 208 at a first maximum voltage. Power supply 204 is configured to provide current to load 208, if at all, at a second maximum voltage lower than the first. In some example, power supply 202 may be configured to supply current at 12.30 VDC, while power supply 204 may be configured to supply current at 12.05 VDC. (In a droop sharing implementation, no other configuration need be done. In an active current sharing implementation, however, any control system that would act to override the lower output voltage setting on power supply 204 would need to be suppressed.) Preferably, both of these maximum output voltages are within a range of input voltages tolerated by load 208. For example, in the drawing, load 208 can tolerate input voltages in the range from 12.00 VDC to 12.40 VDC. Power supply 204 may receive a power input 201.

When system 200 is in state 102, power supply 202 is providing current to supply load 208, but power supply 204 is in an online state and not providing current to load 208. In this online state, an input converter 205 within power supply 204 is on and is acting to maintain an internal DC supply 207 that is available to feed output converter 212, but output converter 212 is not switching. Because power supply 204 is a switching power supply, as long as the second maximum voltage is sufficiently lower than the first maximum voltage and supply 202 is operating normally, control circuitry 210 within supply 204 will cause output converter 212 not to switch. This is so because, under these circumstances, the voltage on output bus 206 will be higher than the maximum configured output voltage for supply 204. Thus, during normal operation, redundant power supply 204 will not provide output current even though it is online.

Should power supply 202 fail, however, the voltage on output bus 206 will drop rapidly. As soon as the voltage on output bus 206 drops below the configured maximum output voltage for power supply 204, control circuitry 210 will cause output converter 212 to begin switching. Preferably, the configured output voltage for power supply 204 will be set sufficiently above the minimum tolerated voltage of load 208 (12.00 VDC in the example) so that power supply 204 will begin switching before the voltage on bus 206 drops below the minimum tolerated voltage.

As persons having ordinary skill in the art will appreciate, the lowest level at which the maximum output voltage of supply 204 may be set will vary with the characteristics of a given implementation of system 200. In general, the faster the response time of power supply 204, the closer its maximum output voltage may be set to the minimum tolerated voltage of load 208.

Figure 3:
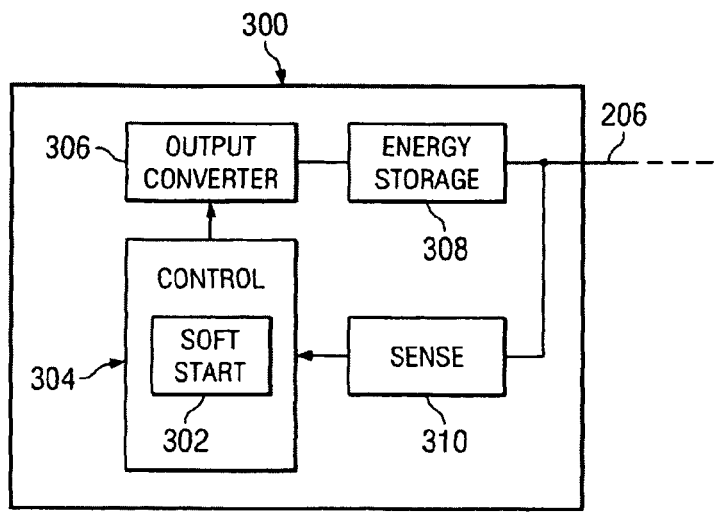
FIG. 3 is a schematic diagram illustrating a redundant power supply with modifiable soft start circuitry according to a preferred embodiment of the invention.

FIG. 3 illustrates a second technique for achieving a solution in accordance with FIG. 1. A redundant power supply 300 may include modifiable soft start circuitry 302. Soft start circuitry (or, equivalently, logic) 302 is modifiable in the sense that it can be disabled, or in the sense that the soft start interval can be varied. For example, when energy storage element 308 is not charged, an initial, longer, soft start interval may be utilized whenever output converter 306 is enabled. But if energy storage element 308 is already charged to a level that is at or near its nominal level, then a shorter soft start interval may be utilized whenever output converter 306 is enabled (or the soft start interval may be eliminated entirely). A variety of techniques may be used to modify the soft start behavior in the desired manner, and will differ depending on the specific design of the soft start system. For example, one such technique would be to pre-charge the soft start circuitry. Other techniques may also be employed. Control circuitry 304 is configured to operate output converter 306, which charges energy storage element 308. Energy storage element 308 may be connected directly to output bus 206.

Preferably, supply 300 will have high speed sense circuitry 310 for determining the voltage level on output bus 206. In other embodiments, sense circuitry 310 may be external to supply 300. When a system utilizing a redundant supply 300 is in state 102, the primary supply in the system may keep energy storage element 308 (and bus 206) charged to the output voltage of the primary supply, and output converter 306 may be disabled by control circuitry 304. While the system is in this state, supply 300 is online—that is, an input converter within supply 300 is on and is maintaining an internal DC supply available to feed output converter 306 should converter 306 be enabled. If sense circuitry 310 detects that the voltage level on bus 206 has fallen below an acceptable threshold, then the system may enter state 106. In state 106, control circuitry 304 can enable output converter 306; but preferably it does so with modified behavior in soft start circuitry 302. For example, converter 306 can enable converter 306 with soft start circuitry 302 disabled altogether, or it can enable converter 306 with soft start circuitry 302 modified so that the soft start interval is shorter in duration than it would be when energy storage element 308 has no charge. The result is that redundant supply 300 begins supplying current to bus 206 more quickly than it would without the modified soft start. In a system that employs a redundant supply 300, the output voltage of supply 300 need not be set differently than the output voltage of the primary supply.

Figure 4:
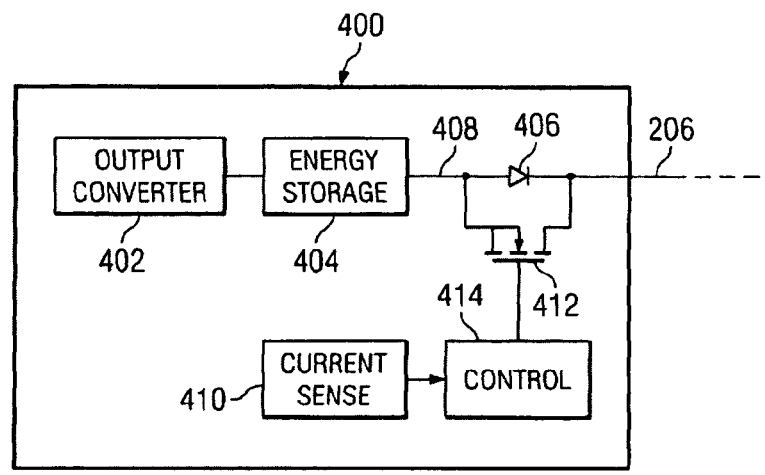
FIG. 4 is a schematic diagram illustrating a redundant power supply with a diode and a switching element according to a preferred embodiment of the invention.

FIG. 4 illustrates another technique that can be employed to achieve a solution according to FIG. 1. A redundant switching power supply 400 may include an output converter 402 that feeds an energy storage element 404. (Energy storage element 404 will normally be a capacitor, but other or additional elements may be used.) Energy storage element is connected to output bus 206 via a diode 406 as shown. Because of the polarity of diode 406, diode 406 will only conduct if the voltage on node 408 at energy storage element 404 exceeds the voltage on output bus 206 by the threshold of the diode. When the latter condition occurs, diode 406 will be forward biased.

In a system that employs a redundant supply 400, the configured maximum output voltage of redundant supply 400 need not be set lower than that of the primary supply. Instead, the configured output voltage of supply 400 may be set equal to that of the primary supply, which may itself be equal to a desired operating input voltage for load 208. In such an arrangement, as long as the primary supply is operating normally, supply 400 will not provide any current to load 208 because diode 406 will not be forward biased. Should the primary supply fail, however, the voltage on output bus 206 will quickly drop. Diode 406 will become forward biased as soon as the voltage on bus 206 falls below that on node 408 minus the threshold of the diode. As soon as diode 406 is forward biased, supply 400 will begin to supply current to load 208.

Preferably, supply 400 will include sensing circuitry 410 for indicating whether supply 400 is providing any output current to load 108. (In the drawing, sensing circuitry 410 is depicted as current sensing circuitry, which can indicate whether supply 400 is sourcing current. Equivalent mechanisms, such as voltage sensing circuitry, may also be used to determine whether diode 406 has become forward biased.) Sensing circuitry 410 can take any conventional form. A switching element 412 may be connected in parallel with diode 406 as shown so that switching element 412, when turned on, can bypass diode 406. Switching element 412 can take any conventional form, such as one or more field effect transistors as shown, or other behaviorally equivalent elements. Preferably, control circuitry 414 turns on switching element 412 as soon as it determines that supply 400 is providing current to load 208 (or equivalently, that diode 406 has become forward biased). By turning switching element 412 on, the on-resistance of diode 406 is eliminated from the circuit when power supply 400 is providing current to the load.

When a system that utilizes a redundant supply 400 is in state 102, energy storage element 404 may be charged to the nominal output voltage of the primary supply, and output converter 402 may be left in an enabled but non-switching state (as was described above). While in this state, output converter 402 may occasionally activate to keep energy storage element 404 charged. Or alternative means may be employed to keep energy storage element 404 charged, such as with an external circuit, or by occasionally turning switch 412 on briefly to allow the primary supply to charge storage element 404. In such a system, detecting the fault condition in step 104 can include determining whether supply 400 is sourcing current to bus 206. And "causing" supply 400 to source current to load 208 as in step 106 can include turning on switching element 412 to bypass diode 406.

In further embodiments of system 200 shown in FIG. 2, the configured maximum output voltages for the power supplies may be made programmable. In such embodiments, a controller 218 may be used to programmatically assign maximum output voltages to power supplies 202, 204. By setting the maximum output voltage of supply 202 higher than that of supply 204, supply 202 can be made the primary supply and supply 204 the redundant supply. By setting the maximum output voltage of supply 204 higher than that of supply 202, supply 204 can be made the primary supply and supply 202 can be made the redundant supply.

Figure 5:
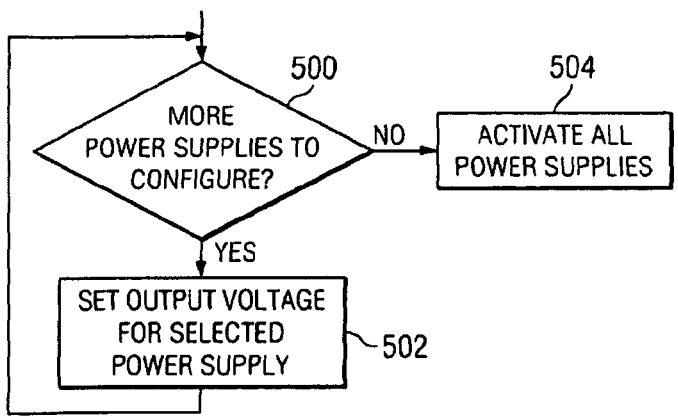
FIG. 5 is a flow diagram illustrating a method of programmatically configuring a plurality of electric power supplies including a redundant switching power supply according to a preferred embodiment of the invention.

FIG. 5 illustrates preferred behavior for such a system. In steps 500 and 502, controller 218 issues commands via communication lines 220, 222 to set the maximum output voltages for each of the power supplies in system 200. In equivalent embodiments, the communication may take place using alternative schemes, such as by using a single communications bus or network. After the output voltages of the supplies have been configured, the controller may activate all of the supplies at step 504, including the redundant supply.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

For example, although system 200 was illustrated herein as having a single primary supply and a single redundant supply, any number of primary and redundant supplies may be employed in systems according to preferred embodiments of the invention. And although specific output voltages and voltage ranges were used herein for purposes of illustration, systems according to preferred embodiments of the invention may be designed for any realistic operating points and voltage ranges depending on the application.

In the appended claims and in the foregoing written description, the words "comprising" and "comprises" are to be read in the open sense to mean "including the following elements but not excluding others." The words "plurality" and "plural" mean "two or more."

What is claimed is:

1. A system, comprising:
   a plurality of electric power supplies connected in parallel to an output bus, the plurality including at least one primary power supply and at least one redundant switching power supply;
   wherein the primary power supply is configured to provide output current to a load when the primary power supply is operating normally; and wherein the redundant switching power supply is configured to remain online while not providing output current to the load when the primary power supply is operating normally, but to begin providing output current to the load when the primary power supply is not operating normally, wherein the output current is direct current (DC).

2. The system of claim 1, wherein:
the primary supply is configured to provide current at a first maximum voltage and the redundant switching power supply is configured to provide current at a second maximum voltage lower than the first maximum voltage.

3. The system of claim 2, wherein:
the first and second maximum voltages are both within a range of input voltages tolerated by the load.

4. The system of claim 3, wherein:
the first maximum voltage is equal to a desired input voltage for the load; and the second maximum voltage is sufficiently lower than the first maximum voltage that control circuitry in the redundant supply does not operate an output converter in the redundant switching power supply while the primary supply is providing current to the load at the desired input voltage for the load.

5. The system of claim 4, wherein:
the range of input voltages tolerated by the load has a minimum tolerated voltage; and
the second maximum voltage is sufficiently higher than the minimum tolerated voltage that, should the primary supply fail, the control circuitry in the redundant switching power supply will begin to operate the output converter in the redundant switching power supply before the voltage on the output bus falls below the minimum tolerated voltage.

6. The system of claim 2, wherein:
a maximum output voltage for at least two supplies in the plurality of supplies is programmable such that a control system, by programmatically setting the maximum output voltages of the at least two supplies, can determine which of the at least two supplies will be the redundant supply.

7. The system of claim 1, further comprising:
a diode connecting a storage element in the redundant switching power supply to the output bus, the diode oriented such that it becomes forward biased when a voltage at the storage element exceeds a voltage on the output bus by a threshold amount; and
a switching element connected in parallel with the diode.

8. The system of claim 7, wherein:
the primary supply is configured to provide current to the load at a desired input voltage for the load; and
the redundant switching power supply is configured such that the voltage at the storage element will not exceed the desired input voltage for the load by the threshold amount, so that the diode will not become forward biased while the primary supply is providing current to the load at the desired input voltage.

9. The system of claim 8, further comprising:
sensing circuitry configured to indicate whether the redundant switching power supply is supplying any current to the output bus; and
control circuitry configured to turn on the switching element to bypass the diode when the sensing circuitry indicates that the redundant switching power supply is supplying current to the output bus.

10. The system of claim 1, further comprising:
soft start circuitry and an output converter in the redundant switching power supply; and
control circuitry configured to change behavior of the soft start circuitry when the output converter is to be enabled and the output bus has been charged to at least a first threshold.

11. The system of claim 10, further comprising:
sensing circuitry configured to indicate whether the voltage on the output bus has dropped below a second threshold; and
wherein the control circuitry is configured to enable the output converter when the voltage on the output bus has dropped below the second threshold.

12. The system of claim 11, wherein:
the second threshold is equal to the first threshold.

13. The system of claim 10, wherein:
the control circuitry changes the behavior of the soft start circuitry by disabling soft start.

14. The system of claim 10, wherein:
the control circuitry changes the behavior of the soft start circuitry by reducing the duration of a soft start time interval.

15. A method of operating a plurality of electric power supplies connected to an output bus, the plurality including at least one primary power supply and at least one redundant switching power supply, the method comprising:
operating the primary supply such that it provides output current to a load connected to the output bus, and simultaneously maintaining the redundant switching power supply in an online state wherein it does not provide output current to the load;
detecting a fault condition; and
responsive to detecting the fault condition, causing the redundant switching power supply to provide output current to the load, wherein the output current is direct current (DC).

16. The method of claim 15, further comprising:
setting an output voltage of the primary supply to a first maximum voltage; and
setting an output voltage of the redundant switching power supply to a second maximum voltage lower than the first maximum voltage.

17. The method of claim 15, wherein:
detecting the fault condition comprises detecting that a diode at an output of the redundant switching power supply has become forward biased; and
causing the redundant switching power supply to provide output current to the load comprises turning on a switching element to bypass the diode.

18. The method of claim 15, wherein:
causing the redundant switching power supply to provide output current to the load comprises enabling an output converter of the redundant supply while changing the behavior of soft start circuitry in the redundant supply.

19. The method of claim 18, wherein:
changing the behavior of the soft start circuitry comprises disabling the soft start circuitry.

20. The method of claim 18, wherein:
changing the behavior of the soft start circuitry comprises reducing the duration of a soft start time interval.

* * * * *